United States Patent [19]

Lindsey

[11] Patent Number: 4,802,604
[45] Date of Patent: Feb. 7, 1989

[54] MODULE BUILDER BACK DOOR LATCH

[75] Inventor: Russell E. Lindsey, Lubbock, Tex.

[73] Assignee: Scott Manufacturing, Inc., Lubbock, Tex.

[21] Appl. No.: 159,788

[22] Filed: Feb. 24, 1988

[51] Int. Cl.⁴ .......................... B65D 43/16; E05C 3/30
[52] U.S. Cl. ...................................... 220/324; 49/280; 100/100; 292/201
[58] Field of Search .......................... 49/280, 281, 293; 220/1.5, 324; 292/144, 201; 100/100, 255

[56] References Cited

U.S. PATENT DOCUMENTS

| | | | |
|---|---|---|---|
| 2,538,980 | 1/1961 | Payne, Jr. ............................... | 49/280 |
| 3,440,764 | 4/1969 | Cover ..................................... | 49/280 |
| 3,990,739 | 11/1976 | Head ..................................... | 49/281 |
| 4,103,608 | 8/1978 | Chenot ................................... | 100/100 |
| 4,155,586 | 5/1979 | Flynn ..................................... | 292/201 |
| 4,307,541 | 12/1981 | Farmer et al. ........................ | 49/280 |
| 4,313,631 | 2/1982 | Johnson ................................. | 292/201 |
| 4,361,985 | 12/1982 | DeMarco ................................ | 49/281 |
| 4,625,455 | 12/1986 | Harris et al. .......................... | 49/281 |
| 4,665,649 | 5/1987 | Hund, Jr. ............................... | 49/280 |

*Primary Examiner*—Jimmy G. Foster
*Attorney, Agent, or Firm*—Wendell Coffee

[57] ABSTRACT

The back door of a cotton module builder is raised and lowered by a hydraulic cylinder extending from above the back door to a latch shaft extending across the back door. Movement of the hydraulic cylinder latches and unlatches latch bolts upon the latch shaft as well as raising and lowering the back door.

3 Claims, 1 Drawing Sheet

MODULE BUILDER BACK DOOR LATCH

RIGHTS TO INVENTIONS UNDER FEDERAL RESEARCH:

There was no federally sponsored research and development concerning this invention.

BACKGROUND OF THE INVENTION (1) Field of the Invention

This invention relates to door openers and latches, and more particularly to an opener and latch for the back door of a cotton module builder.

(2) Description of the Related Art

The assignee of this application is the owner of U.S. Pat. No. to Don R. Johnson, 4,313,631.

U.S. Pat. No. 4,313,631 discloses a cotton module builder. The builder includes a back door or gate which is hinged at its top to the top frame of the module builders. Units built according to this patent are commercially on the market. The back door is raised and lowered by two hydraulic cylinders. The door is held closed by a latch which is hydraulically operated. The hydraulic ram or cylinder which operates the latch is hydraulically connected to the two cylinders which raise the back door. A lost motion mechanism permits the latch bar to raise upward even if the latch cylinder is in the contracted position holding the latch bar down.

In operation of the module, as much as 20,000 pounds of cotton is compressed within the module builder to form the module. Considerable pressure is exerted on the cotton so that it will form a self-contained module which is held together by the seed cotton and burrs within the module itself. The back door is over 6½ feet tall and about 7½ feet wide and will weigh about 500 pounds.

To withstand the internal pressures exerted upon the door, particularly when the cotton is being tramped or compressed to form the module, it is necessary to have the door braced, and particularly to have a cross-brace at the point where the doors latch. The door being held closed without a reinforcement bar would tend to buckle at this point and spring open if it were not reinforced for rigidity.

SUMMARY OF THE INVENTION (1) Progressive Contribution to the Art

I have invented a latching mechanism which is extremely simple; and therefore, trouble free. The improved system includes only a single cylinder. The cylinder extends from the top frame. The single cylinder is connected to a lug upon a latch shaft on the back door. Rotation of the shaft causes the latch bolts to rotate free of a catch on the side panels of the module builder. When the door is closed by gravity, the door cylinder slows the descent of the door, but the hydraulic cylinder does not force the door closed. Therefore, until the door is closed, there is tension upon the cylinder. However, when the door is closed, operation of the cylinder will again operate the latch through the lug on the shaft to rotate the latch bolts into latching position.

Thus, it may be seen that I accomplish the unlatching, raising, lowering, and latching of the door of the module builder with only a single hydraulic cylinder with simple mechanical components.

(2) Objects of this Invention

An object of this invention is to make cotton modules.

Another object of this invention is to provide an improved door opening and latch mechanism.

Further objects are to achieve the above with devices that are sturdy, compact, durable, lightweight, simple, safe, efficient, versatile, ecologically compatible, energy conserving, and reliable, yet inexpensive and easy to manufacture, connect, operate, and maintain.

Other objects are to achieve the above with a method that is rapid, versatile, ecologically compatible, energy conserving, efficient, and inexpensive, and does not require highly skilled people to connect, operate, and maintain.

The specific nature of the invention, as well as other objects, uses, and advantages thereof, will clearly appear from the following description and from the accompanying drawing, the different views of which are not scale drawings.

Figure 1:
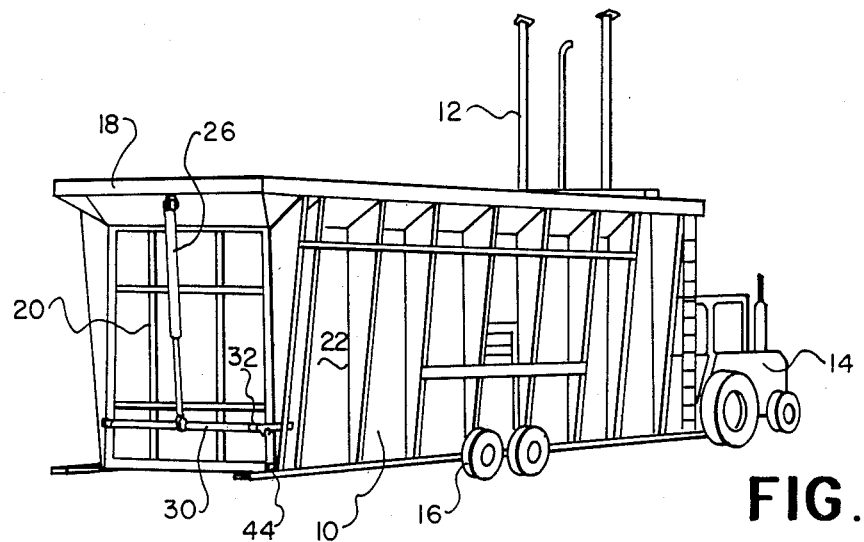
FIG. 1 is a perspective view of a cotton module builder embodying my invention.

As an aid to correlating the terms of the claims to the exemplary drawing, the following catalog of elements and steps is provided:

| 10 | module builder | 30 | latch shaft |
|----|----|----|----|
| 12 | tramper mechanism | 32 | bearings |
| 14 | farm tractor | 34 | square tube |
| 16 | wheels | 36 | crank |
| 18 | rectangular top frame | 38 | latch bolt |
| 20 | back door | 40 | catch |
| 22 | sloping side panels | 42 | notch |
| 24 | hinge | 44 | guides |
| 26 | hydraulic cylinder | 46 | stop |
| 28 | lug | | |

DESCRIPTION OF THE PREFERRED EMBODIMENT

Referring to the drawings, there may be seen a typical module builder 10. As may be seen, it has tramper mechanism 12 to compact cotton therein. The power for the tramper is conveniently supplied by hydraulic pump upon farm tractor 14. Therefore, the tractor 14 may be considered as a source of hydraulic fluid to the builder. Hydraulic fluid under pressure will be used to lower wheels 16, thus raising the builder 10 for movement from one location to another.

The cotton module builder 10 also includes a rectangular top frame 18 which extends around the top of the sloping side panels 22. Also, it extends around the top of back door 20.

Figure 2:
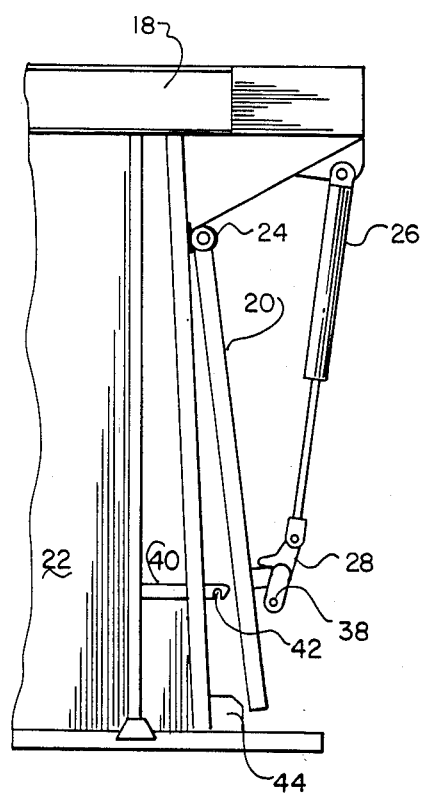
FIG. 2 is a side elevational view of the rear of the module showing the back door in a position it would be when slightly open.
Figure 3:
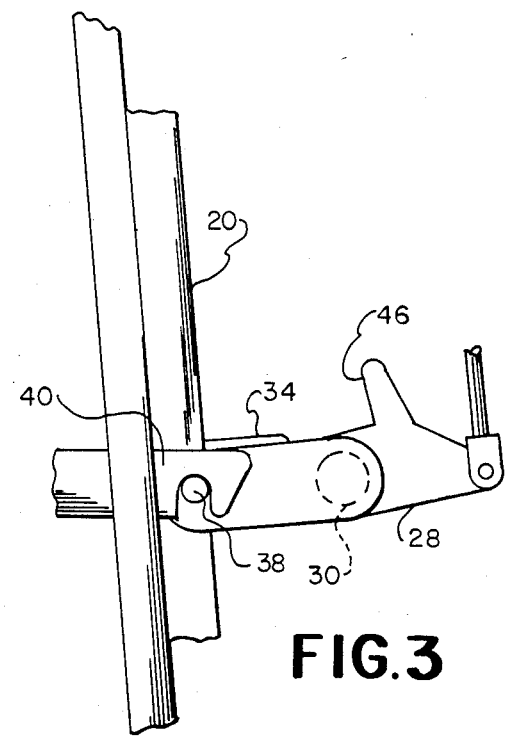
FIG. 3 is a side elevational view similar to FIG. 2 showing an enlarged view of the latching mechanism when the back door is closed and latched.
Figure 4:
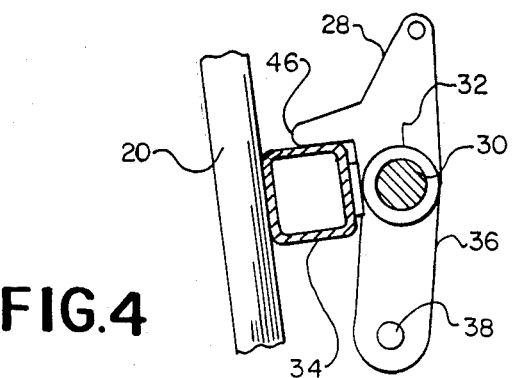
FIG. 4 is a view of the lug, crank, and latch pin when the cylinder is exerting tension thereupon.

Before the unit may be moved, the tailgate or back door 20 must be raised. The door is attached to the rectangular frame 18 by hinge 24 which extends along the top of the door. The back door 20 also slopes outward, as seen particularly in FIG. 2. The angle by which the back door 20 slopes outward has been exaggerated in the drawing to emphasize that the door closes by gravity. It is raised by hydraulic cylinder 26 which extends from the rectangular top frame 18 to a latch operator in the form of lug 28. The term hydraulic cylinder 26 has been used to indicate a hydraulic cylinder and rod. However, as normally used in the art, it is referred to only as a hydraulic cylinder although it will be understood that it includes the rod as well as the cylinder.

Latch shaft 30 is horizontal. The latch shaft 30 is journaled within bearings 32 which are attached to square tube 34. Square tube 34 is welded to the lower portion of the door 20 on the outer surface thereof. The square tube 34 is the desirable reinforcement of the back door at the latches to prevent the door from buckling as explained above. The latch Shaft 30 has two ends. Lug 28 is mounted at about the center of the latch shaft. A crank 36 is attached at each end of the latch shaft 30. Latch bolt 38 extends outward on each crank 36.

On the rear edge of each of the side panels 22, catch 40 is attached. Notch 42 in the catch 40 is built to receive latch bolts 38. Guides 44 are attached at the bottom of the panels 22 to guide the door into proper position so that the latch bolts 38 will fit and engage the notch 42 of the catch 40.

The back door is operated from a position near the back door. The back door closed and latched; operation of the hydraulic system is by valves (which have not been shown for clarity in the drawings) which will cause contraction of the cylinder 26. This contraction will move the lug 28 upward, thereby rotating the latch shaft 30, and thus removing the latch bolts 38 from the notch 42 in the catch 40. Simply stated, the back door will be unlatched responsive to contraction of the cylinder 26.

After the door is unlatched, continued contraction of the cylinder will raise the back door into horizontal position so that forward movement of the module builder 10 by the tractor 14 will cause the module builder to move away from the module of compacted cotton therein. When the module builder is in a new location and is lowered to rest upon the ground by raising the wheels 16, the back door is closed.

Closing the back door 20 is by releasing the hydraulic fluid which has caused the contraction of the cylinder 26. The back door will be closed by gravity. As the back door is being closed by gravity, the cylinder will be expanded. After the back door has been closed, continued expansion of the cylinder 26 will push the lug 28 downward to rotate the latch shaft 30 to engage the notch 42 and the catch 40 by the latch bolts 38. Or simply stated, the back door will be latched by continued expansion of the cylinder 26.

Stop 46 is placed upon the lug 28 so that under no circumstances will the expansion of the cylinder 26 upon the lug be when the lug 28 is at top dead center. The stop 46, by engaging the square tube 34, will prevent rotation of the lug so that the lug will be in a binding position upon further expansion of the cylinder 26.

Thus it may be seen that I have provided a simple mechanism using only a single hydraulic cylinder to unlatch and raise the back door, as well as lower the back door and latch the same. As a practical matter, the valve for the back door will be located on one of the side panels 22 near the latch bolt 38 so that the operator thereof will have the back door 20 in view as it is being raised and, lowered to prevent injury because of some person or animal in the vicinity thereof or to prevent damage to the equipment in the event there was an obstruction to the raising or lowering of the door.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:
1. In a cotton module builder having:
   a. a rectangular top frame,
   b. side panels sloping outward from the top frame, and
   c. a back door having an outer surface hinged at its top to the top frame, and sloping outward;
Wherein the Improvement Comprises
   d. a horizontal latch shaft having two ends journaled to the lower outer surface of door,
   e. a lug on the shaft,
   f. a crank on each end of the shaft,
   g. a latch bolt on each of the cranks,
   h. a catch on the rear of each of the side panels,
   i. so arranged and constructed that when the door is closed rotation of the shaft will cause each of the latch bolts to engage the catches and securely latch the door closed, and
   j. a hydraulic cylinder interconnecting the top frame and the lug on the latch shaft
   k. so arranged and constructed that contraction of the cylinder will first rotate the shaft to unlatch the door and continued contraction will raise the door, and
   l. expansion of the cylinder will permit gravity to close the door and continued expansion will rotate the shaft to latch the door as set out above.
2. The process involving a module builder having
   a. a rectangular top frame,
   b. sides sloping outward from the top frame, and
   c. a back door having an outer surface hinged at its top to the top frame, and sloping outward;
Wherein the Improved Method Comprises:
   d. extending a hydraulic cylinder and rod from the top frame to a rotatable shaft on the outer surface of the lower half of the door,
   e. rotating the shaft by
   f. contracting the cylinder,
   g. unlatching the door responsive to the rotation of the shaft,
   h. raising the door by further
   i. contracting the cylinder after the door is unlatched, then
   j. permitting gravity to close the door by
   k. expanding the cylinder, and
   l. further expanding the cylinder thereby
   m. rotating the shaft, thus
   n. latching the door.
3. The process involving a module builder having
   a. a rectangular top frame,
   b. sides sloping outward from the top frame, and
   c. a back door having an outer surface hinged at its top to the top frame and sloping outward;
Wherein the Improved Method Comprises:

d. extending a hydraulic cylinder from the top frame to a latch operator on the outer surface of the lower half of the door,
e. operating the latch to unlatch the door responsive to
f. contracting the cylinder,
g. raising the door by further
h. contracting the cylinder after the door is unlatched, then
i. permitting gravity to close the door by expanding the cylinder, and
j. latching the door by
k. further expanding the cylinder after the door is closed.

* * * * *